April 7, 1964 P. KLAMP 3,127,849
SUB-FLOORING CONVEYOR CONTROL SYSTEM
Original Filed Sept. 9, 1957 2 Sheets-Sheet 1
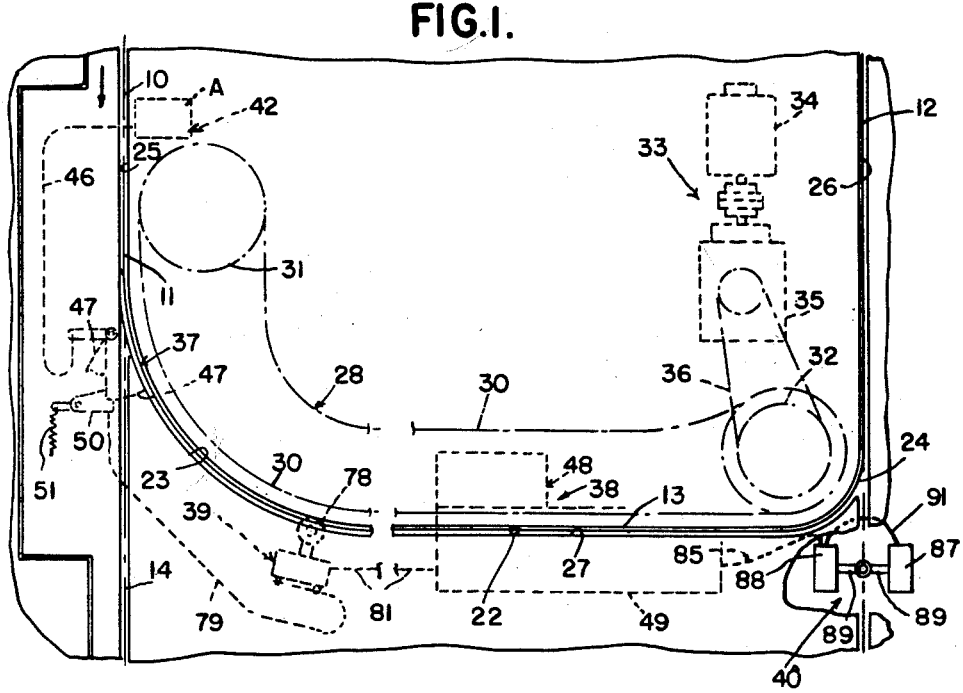
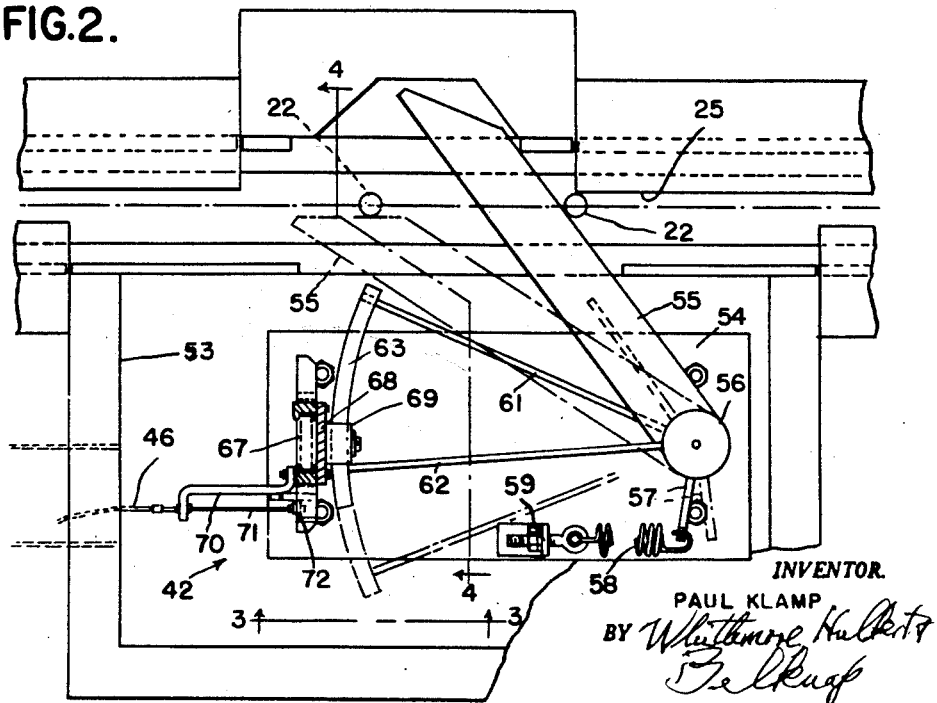
INVENTOR.
PAUL KLAMP
BY
ATTORNEYS April 7, 1964      P. KLAMP      3,127,849
SUB-FLOORING CONVEYOR CONTROL SYSTEM
Original Filed Sept. 9, 1957      2 Sheets-Sheet 2

INVENTOR.
PAUL KLAMP
BY
ATTORNEYS

United States Patent Office 3,127,849
Patented Apr. 7, 1964

3,127,849
SUB-FLOORING CONVEYOR CONTROL SYSTEM
Paul Klamp, St. Clair Shores, Mich., assignor to Mechanical Handling Systems, Incorporated, Detroit, Mich., a corporation of Michigan
Original application Sept. 9, 1957, Ser. No. 682,797, now Patent No. 3,045,610, dated July 24, 1962. Divided and this application July 16, 1962, Ser. No. 210,066
8 Claims. (Cl. 104—88)

The present invention relates to improvements in a continuously operating conveyor system for industrial, warehouse and like use. The present application is a division of my copending application, Serial No. 682,797, filed September 9, 1957, and entitled "Sub-Floor Conveyor System," now Letters Patent No. 3,045,610 of July 24, 1962.

As here illustrated and described, the invention contemplates sub-floor truck tow lines for factory, warehouse, loading dock or like installations, in which it is the function of several tow chain arrangements to transport load carrying trucks in an automatically controlled fashion above the floor. Thus the trucks may be drawn above and along a main chain powered tow line and selectively through transfer or branch lines, which may also be individually chain powered, under the control of automatic sub-floor switching provisions to engage a depending tow pin on the truck for the purpose.

Provisions are also made to accumulate trucks at any desired point in the system; and though the system chosen for illustration is a simple one, involving but a single main line or track and a single branch or transfer line operating between reaches thereof, it is to be understood that the system may readily be expanded and adapted for far more complex installations. All types of switching of load bearing trucks or like units, i.e., between conveyor tracks or lines, from a live conveyor to a dead storage or like station, etc., are contemplated.

It will also be evident to those skilled in the art, as the description proceeds, that certain principles of the invention have general applicability in other conveyor equipment, for example, of the overhead type, whether fully powered or power and free.

It is an object of the invention to provide a comprehensive, automatically switching and accumulating conveyor system including a main power conveyor having truck forwarding, sub-floor chain connected trolleys, and a branch or transfer conveyor chain operating beneath the floor and divergently of the main conveyor, the branch conveyor having truck engaging dogs coacting with the main conveyor trolleys in controlling the travel of trucks along main and branch paths. This is accomplished by the controlled engagement of trolley dogs and the branch conveyor dogs with depending tow pins on the trucks.

In general, the invention has as its object the provision of a sub-floor signaling device for operating a floor switch unit engaged by such a tow pin, enabling such switch unit to control the travel of a mobile floor unit, such as a tow truck. The device in question generally comprises a movable actuator in the form of a toothed comb member normally positioned beneath the floor in the absence of a mobile unit thereabove, and adapted to be elevated above the floor for operation by a passing mobile unit. As thus operated, the comb actuator produces a desired operation of the floor switch unit. The signaling device further comprises a control member mounted beneath the floor and adapted to be engaged and operated by the tow pin of a mobile truck unit traveling in a floor slot above the control member; and there is an operating cam connection between this control member and the comb actuator to elevate the latter above the floor for operation by the passing mobile unit, thus to operate the switch unit through an operating connection of the latter to the actuator.

In accordance with another object, individual control and switching units are operated by the trucks to govern the selective departure of trucks from the main conveyor line onto and along the branch or transfer line, the halting of the trucks to accumulate on the branch, and the return of such diverted trucks to another line, as another reach of the main conveyor.

A further object of the invention is to provide a control system of the foregoing type featuring a sub-floor control mechanism operated by trucks for the purpose described in the preceding paragraph, which acts in conjunction with an accumulation mechanism at which trucks are halted on the branch line, with operating connections between these mechanisms and a switching unit by which trucks are controlled, as to diversion from a main line to a branch line, in an improved manner. This involves the use of mechanism on the branch line operatively connected to the switching unit in a manner to choke off the diversion of a truck to the branch line in the event the latter is occupied by a sufficient or maximum intended number of trucks accumulated at the branch line.

It is another object to provide conveyor equipment of the sort described, in which the load bearing floor trucks are taken from the control of the sub-floor main conveyor trolleys and advanced into, along and out of the branch line by a positively driven transfer conveyor chain which is individually powered and requires no particular synchronization of its drive with that of the main conveyor.

As illustrated in the present invention, the switching unit referred to takes the form of a pivoted track tongue or frog which is latched in place, as between straight-through or switching positions, under the control of sub-floor control mechanisms on its upstream main track side and on its branch track side, these control mechanisms being operatively connected to the switch unit for coordinated switch-out and choke action, preferably by flexible cable means. However, the invention also contemplates a switching unit of the pull-out hook arm type illustrated in my Patent No. 3,045,610, identified above.

A further general object is to provide an improved sub-floor control device, in particular of a mechanical nature, to govern the action of the switch mechanism referred to, as by flexible cable means. This device is disposed substantially entirely beneath the floor level, a part thereof coming above the level only when a truck is over that part, and is selectively operated or tripped by an advancing truck, in accordance with a predetermined setting of a tripping actuator on the truck, to initiate action of the switch mechanism, as by unlatching its switch tongue.

Generally speaking, an object is to provide a conveyor system which may be operated as to its control by a mechanical means throughout, for example under the control of flexible cables, thus to accomplish a great reduction in installation as well as maintenance cost, as compared with electrically, hydraulically and/or pneumatically operating control systems; in which accurate timing of coacting parts, especially the conveyors, is not a factor; yet in which there is no possibility of damage due to mechanical jamming or interference of any parts in their coactive operation.

Nevertheless, though it is an advantage of the system that it may be mechanically operated and controlled exclusively and throughout, it is well adapted for a conversion, involving minimum cost and time, into a system controlled in substantial part by non-mechanical means.

The foregoing as well as other objects will become more apparent as this description proceeds, especially when considered in connection with the accompanying drawings illustrating the invention, wherein:

FIG. 1 is a fragmentary top plan view, schematic in character, of one embodiment of sub-floor system according to the invention, characterized by a tongue or frog type of switch unit at the junction of main and branch line floor tracks;

FIG. 2 is a fragmentary top plan view of an improved sub-floor switch control mechanism of the invention in the area designated "A" in FIG. 1, with the floor plate removed to expose the parts; different positions of which are indicated in solid and dot-dash line;

Figure 3:
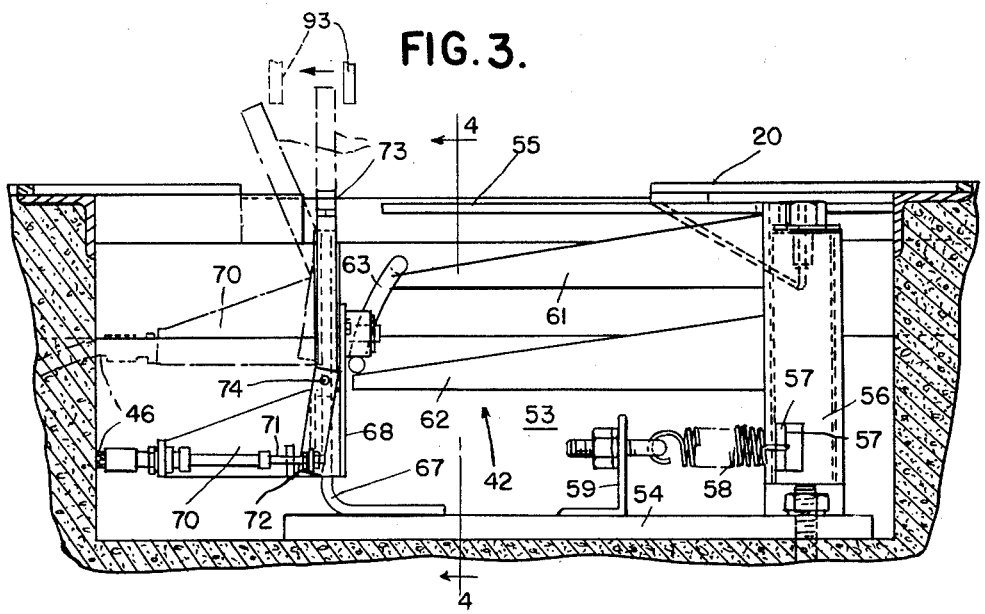
Figure 4:
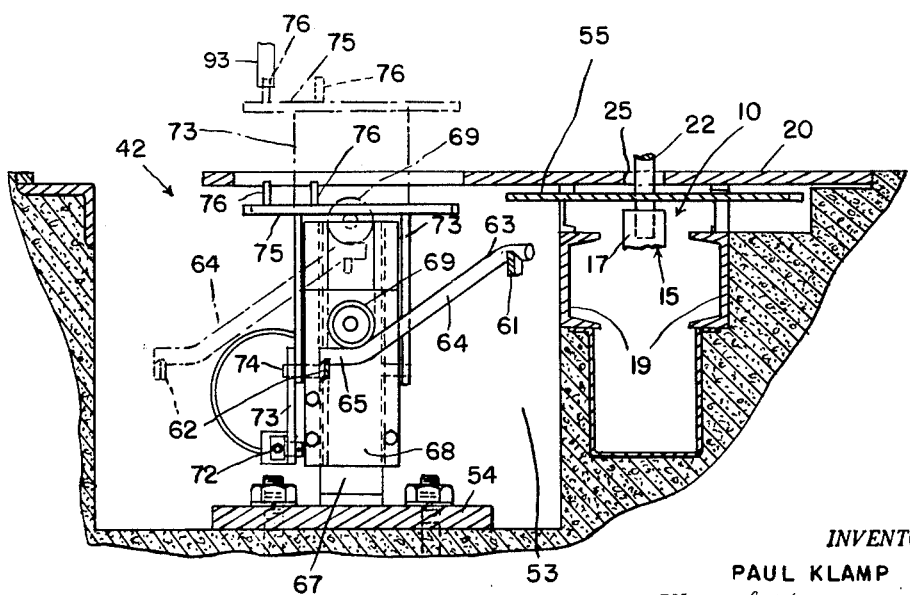

FIG. 3 is a side elevation of the mechanism of FIG. 2, as viewed from line 3—3 of FIG. 2, different positions of the parts here also being indicated in solid, dot-dash and dotted line; and FIG. 4 is a sectional view along line 4—4 of FIGS. 2 and 3, further illustrating the sub-floor control in its relation to the conveyor.

Referring first to FIG. 1 of the drawings for a schematic plan layout of the overall system, the reference numeral 10 generally designates a main sub-floor conveyor, operating in the direction indicated by arrow, and characterized by a longitudinal main line reach or portion 11 from which it is desired to divert the tow pins 22 of selected load transporting trucks or dollies. The numeral 12 designates another, return reach of conveyor 10, into which it is desired to restore such trucks by conveying them along an intermediate branch conveyor reach or portion 13 connecting the reaches 11 and 12.

It is to be understood that FIG. 1 simply typifies a conveyor cross over and connect installation, and that the invention equally applies to other desired layouts, as for example a dead storage branch associated with a main powered conveyor, a return from such a branch to a conveyor, etc. The invention is unlimited in respect to the simplicity or complexity of the particular desired setting.

As shown in FIG. 1 and in my Patent No. 3,045,610, the main sub-floor conveyor 10 includes an endless chain 14 powered from any appropriate source, to which standard type trolleys 15 (FIG. 4) having counterweighted, retractable front restraining and rear driving dogs 17 are pivotally mounted in suitable longitudinal spacing, in an entirely conventional manner. The trolleys 15 are spaced on chain 14 at intervals of, say, twelve feet, and rollers supporting them ride opposed channel track sections 19 (FIG. 4) of the main conveyor 10. This structure is appropriately mounted beneath floor plating 20, which is slotted to receive depending tow pins 22 of the load bearing trucks. Structural details of the truck, truck tow pin arrangement are shown in the parent application; and associated means according to the present invention to govern the operations of transferring the control of the trucks to and from the branch track conveyor are as hereinafter described.

As appears in FIG. 1, communication of the branch 13 with the main conveyor reach 11 is established through an arcuate floor slot 23; while communication of the branch track 13 with the other or main conveyor return reach 12 is similarly had through an arcuate floor slot 24. The floor slot of the main conveyor reach 11 is designated 25, and that of the return reach 12 is designated 26, while the intermediate floor slot of the branch or transfer conveyor reach 13 bears the reference numeral 27.

The transfer conveyor is generally designated 28. As shown in FIG. 1, it takes the form of an endless chain 30 trained about a vertically journalled idler sprocket 31 adjacent main reach 11 and at its opposite extreme about a driving sprocket 32 adjacent the track return reach 12. Conveyor 28 traverses an orbital path which is generally L-shaped as viewed in plan, in conformity with the outline of branch reach 13 and its merger with the main reaches 11, 12.

The numeral 33 generally designates an independent driving unit for the branch conveyor; it may consist of a motor 34, a speed reducer 35 driven thereby to drive the sub-floor conveyor chain 30 at any desired speed, which may be less than that of the main conveyor chain 14, and a chain and sprocket arrangement 36 through which the driving connection to chain sprocket 32 is made.

The reference numeral 37 generally designates (FIG. 1) a switch mechanism adjacent the zone of exit from main reach 11; the reference numeral 38 generally designates a truck release mechanism associated with branch reach 13 adjacent the return or reentrance reach 12; the reference numeral 39 generally designatess a switch reset unit in part controlled by the mechanism 38; and the reference numeral 40 generally designates a control mechanism or station adjacent the main return reach 12, in advance of the branch 13, at which the control of the truck release mechanism 38 is perfected. This is done by automatically detecting and signaling as to whether or not a conveyor trolley 15 approaching on the reach 12 is hooked to and forwarding a truck. Mechanism 40 is referred to as an empty place spotter.

The reference numeral 42 in the figures generally designates an advance signal station, mechanism or unit adjacent main conveyor line 10, on the approach side of the latter to the switch mechanism, with which station 42 certain improvements of the invention (shown in FIGS. 2, 3 and 4) are concerned. The signal unit or station 42 will optionally control the release of the switch mechanism 37 of the system, as by tensioning of a flexible cable connector 46, in the manner hereinafter described with reference to FIGS. 2, 3 and 4.

As shown in FIG. 1 the switch unit 37 comprises a conventional pivoted sub-floor switch tongue or frog 47 at the junction of floor tracks 23, 25.

As illustrated and described in the parent application, the truck release mechanism 38 incorporates a tow pin release and reset unit 48 and an improved cushioned, anti-shock type, automatic truck accumulator and release unit 49, which is mechanically coupled to and coacts automatically as a shock-absorber release mechanism with the release and reset unit 48 under the control of advancing trucks.

As part of switch unit 37, a pivoted latch 50 is urged by a coil spring 51 in a direction to engage and normally maintain the truck switch tongue 47 in the position shown in FIG. 1, in which truck tow pins 22 traversing main track 10 are diverted onto the branch or transfer track 13.

Referring now to FIG. 2, 3 and 4, the advance signal unit or station 42 has its parts housed within a sub-floor well 53 of the installation, being rigidly mounted on a base plate 54. A control member in the form of an operating lever 55 extends laterally outwardly from this space beneath and across the floor slot 25 of the main conveyor reach, this lever being secured on a tubular post or sleeve 56 which is journaled on an upright axis within the well 53, adjacent the rear end of the latter. A lateral arm 57 extends from the pivot sleeve 56 at the bottom thereof, and this arm is urged by a coil tension spring 58 connected to a fixed anchor 59, so as to swing the control member or lever 55 clockwise, as viewed in FIG. 2, to a fully projected position across the path of the truck tow pins 22. It is mechanically engaged by these pins to swing it counterclockwise from the solid to the dot-dash line position of FIG. 2.

Sleeve 56 is also equipped with a pair of vertically spaced, divergently projecting upper and lower arms 61, 62, which arms have a shaped cam rod 63 welded or otherwise secured to their outermost extremities. The shape of the cam rod 63 appears in FIGS. 2, 3 and 4; it extends from a relatively elevated point at its connection to the upper arm 61 downwardly at an angle at 64, thence to a horizontal terminal portion 65 at its connection to the lower arm 62.

An upright fixed guide 67 in the form of a rigid L- shaped strap is secured on the base plate 54 forwardly of the cam rod 63. As best illustrated in FIG. 2, the upright portion of the strap 67 guides a slide member 68 which is of generally U-shaped horizontal cross section, and the slide 68 provides a mount for a horizontally journaled cam follower roller 69. Roller 69 rides on the cam rod 64, as best shown in FIG. 4.

The slide member 68 is formed to provide an internal way which engages opposite vertical edges of the guide strap 67, sliding freely up and down the latter as the cam rod 64 is swung from the solid line position of FIGS. 2–4 to the dot-dash line position. The opposite side of the slide 68 has a bracket 70 fixed thereon which anchors the cable sheath encasing the movable wire tension element 71 of the flexible cable 46, the opposite, remote end of which is connected to the switch tongue 47 (FIG. 1).

The near end of the cable tension element 71 is secured at 72 to the lower extremity of a comb-type actuator arm 73 which is pivotally mounted on the slide 68, as by a pin 74 disposed at a right angle to a side of the slide.

Thus, it is seen that as the cam rod 63 is swung counterclockwise (FIG. 2) to elevate the follower roller 69, the slide 68 correspondingly elevates the bracket 70 and the actuator comb 73 from the solid to the dot-dash line position of FIG. 4, in which it is disposed sufficiently above floor plate 20 to be engaged by an adjustable element 93 of the control unit on an advancing truck (not shown).

As indicated in FIG. 4, the actuator 73 comprises a transversely extending plate or like mount 75 equipped with one or more upstanding teeth 76, any one of which is engaged or not by the adjustable control unit of a truck, depending upon the setting of the latter, as illustrated and described in my copending application identified above. If so engaged, the actuator comb 73, as located by lever 55 in the elevated condition shown in dot-dash line in FIG. 3, is swung laterally counterclockwise or forwardly with the result that the flexible cable tension wire 71 is drawn in to the right. Engagement of the truck-borne control device with the actuator 73 is determined by the lateral adjustment of its own comb-like tappet element 93 by means not germane to the present invention.

A simple type of sub-floor comb trip arrangement is depicted in FIGS. 2, 3 and 4 for use in a case where but a single switching operation is desired. However, it is within the contemplation of the invention that multiple switching operations may be performed, as by equipping the comb plate 75 with a number of laterally spaced teeth 76 which may be engaged or missed by coacting comb tooth or tappet means on the truck, of which there may also be a number. Thus, further switching of the truck, as diverted or not diverted by the switch mechanism 37, may be provided for.

Now referring to FIG. 1, the switch tongue 47 is shown in the position in which it is placed by actuation of the advance signal station 42, a truck arriving at that station having caused the tensioning of the flexible cable 46 to swing the tongue counterclockwise. This is done against the opposition of spring means (not shown) biasing the tongue 47 clockwise, as viewed in FIG. 1, and the tongue is retained in the counterclockwise setting by the spring biased latch 50, so as to divert the signalling truck and its tow pin 22 onto the branch reach 13.

Having passed the tongue 47, the truck tow pin 22 next operates a tappet arm 78 of the reset unit 39 (FIG. 1) with the result that a flexible cable 79 of that unit is tensioned, pulling the latch 50 clockwise (FIG. 1) and releasing the switch tongue 47; it thereupon swings back clockwise as viewed in FIG. 1 to the position in which it permits straight-through travel on the line of main conveyor 10. If the next truck fails to trip signal unit 42, that truck proceeds undiverted along the main track 10. Otherwise, tongue 47 is reset to switching position.

Structural features of various components of the basic improved system illustrated and described in Patent No. 3,045,610 have, for the purpose of simplicity, been omitted here as not bearing particularly upon the advance sub-floor signal unit 42. The latter coacts in a general way with other schematically depicted component units or mechanisms, for example the switching unit 37, the reset unit 39, accumulation and reset mechanism 38 composed of the units 48 and 49, and the empty place spotter mechanism 40; hence these need but brief description, reference being made for further details to Patent No. 3,045,610.

The transfer chain 30 is provided with pivotally mounted dogs (not shown) which, as the chain advances to the zone of switch unit 37, are sustained in a position for propelling engagement with the truck tow pins 22 by suitable fixed back-up rail means (not shown). The switch tongue 47 acts to divert a tow pin into the arcuate track slot 23 for travel along branch track slot 27; and upon the arrival at the truck release station 38, the dog is, upon operation of a movable back-up rail (not shown) of the mechanism or unit 48, permitted to swing backwardly out of propelling relation to a truck tow pin, being brought to a cushioned halt by the unit 49. The main track chain 14 and its trolleys 15 (FIG. 4) may be driven at a speed which is higher than that of the branch track chain 30 and its dogs just referred to.

The mechanism 38 is in turn connected by a flexible cable 85 to the empty place spotter mechanism 40, which determines whether the movable back-up rail referred to (but not shown) of the unit 48 shall be restored to a dog supporting position. This in turn depends upon whether a main track trolley 15 approaching the mechanism 40 adjacent the re-entry zone of floor slot 26 is or is not occupied by a truck and its tow pin 22.

As illustrated and described in Patent No. 3,045,610, and also in my Letters Patent No. 3,024,741 of March 13, 1962, the empty place spotter mechanism 40 comprises two similar cable pull mechanisms 87, 88, each characterized by an operating arm 89 similar to the arm 78 of the switch reset unit 39. The arms 89 of the respective mechanisms or units 87, 88 are positioned at different elevations beneath the floor track slot 26 that of unit 87 being actuated only by truck tow pins 22 and being missed by trolleys 15 powered by conveyor portion 12; whereas the other cable pull unit 88 has its operating arm 89 positioned sufficiently low to be engaged and operated only by conveyor trolleys 15.

Empty place spotter 40 is cable-connected to the truck release mechanism 38 in such manner that the latter will be operated to raise the back-up rail (not shown) of the mechanism 38 to an operative position to sustain dogs of the transfer conveyor 30 in propelling position only in the event a trolley 15 free of a truck is advancing on the main track return reach 12.

To this end a flexible disabling cable 91 operated by the cable pull unit 87 is operatively connected to the other cable pull unit 88 of empty place spotter 40 in such manner as to disable the unit 88 when the unit 87 is operated by the tow pin of a truck. As thus disabled, the cable pull 88 is ineffective to transmit a signal through cable means 85 to the unit 38, such as would place the back-up rail in a position to sustain a transfer chain dog (not shown) for propelling engagement with the tow pin 22 halted at the branch track accumulation station. Full disclosure of the joint operation of empty place spotter 40 and the unit 48 of the combined release mechanism 38 is contained in my Patent No. 3,024,741 mentioned above.

A truck halted at the mechanism 38 remains in this position, as described in Patent No. 3,045,610, until a unit (not shown) located forwardly of unit 49, quite similar to the unit 39 and corresponding to the unit shown in FIGS. 12, 13 and 14 of my Patent No. 3,045,610, is operated by a truck tow pin preceding the tow pin halted by the unit 49 shown. It is within the contemplation of the invention that trucks may be successively halted and accumulated along the branch track 13, as ultimately controlled by the cables 85, 91 of the empty place spotter unit 40.

In an installation involving either a single unit 38 of the shock absorber type reset and release nature embodying units 48, 49, or characterized by a plurality of such combined units, it may be desirable to prevent switching of a truck onto the branch track so long as such combined units are occupied by a truck or trucks. For this purpose the system operates through the agency of the cable connection 81 between the switch reset unit 39 and the combined unit 38 first beyond the same in the direction of travel of trucks along the branch track, which in a multiple installation would be the last of the said combined units. Through the agency of such connection the switch reset unit 39 is caused to prevent the latch 50 from taking a position to hold the switch tongue 47 in the diverting position. This involves the use of a switch reset unit 39 having latch means of the type illustrated in my Letters Patent No. 2,949,862 of August 23, 1960 (FIG. 10), whereby the cable connection 79 to the switch latch 50 is itself latched temporarily in a tensioned condition. As a consequence, so long as the accumulation stations along the branch track are occupied, all trucks will travel undiverted past switch tongue 47 along the main conveyor floor slot 25. As soon as a station becomes unoccupied the reset unit 39 is unlatched through the agency of cable 81, enabling latch 50 to return to a position in which it is able to hold switch tongue 47 in its diverting position.

Otherwise, even if the advance signal station "A" operates switch tongue 47 instantaneously through cable 46, the tongue will immediately be spring-returned to its straight-through condition.

In operation, assuming that the trucks have been adjusted as to the settings of their respective depending comb-like signal actuators 93 for the purpose of initiating a signal through cable 46 from signal unit 42 (station "A") to cause the trucks to be switched onto the branch track reach 13, the tow pin 22 of the truck will engage and trip the sub-floor lever 55 (FIGS. 2-4), swinging it from the solid to the dot-dash line position of FIG. 2. This causes the cammed elevation of the sub-floor comb extension 73 above the floor, where it is next engaged by the truck-borne signal actuator, as adjusted on the truck for such engagement. Such actuator may be, as illustrated and described in my Patent No. 3,045,610, a depending control tappet or tappets 93 (FIGS. 3 and 4) mounted for selective horizontal adjustment on the tow truck in the direction at 90° to its travel, the tappet 93 of the signaling truck being so positioned that it will engage a tooth 76 of the comb 73 and thereby trip the elevated sub-floor actuator 73. The cable 46 is tensioned, thus swinging the switch tongue 47 counterclockwise (FIG. 1) to its truck diverting position, being held in that position by the spring-biased latch 50.

As the tow pin 22 is diverted and traverses the floor slot 23, the tow pin comes under the control of a dog on the branch conveyor chain 30. It is forwarded by this dog to the shock absorber truck release and reset unit 49 at station 38, the backing rail of which (not shown) is at this time latched in a depressed position so as not to give lateral support to the dog. Hence the dog falls away from the tow pin, and the motion of the truck comes to a cushioned halt. The release mechanism 38 is conditioned as described by a unit resembling the unit 39 and located downstream of the mechanism 38, such downstream unit being shown in FIGS. 12, 13 and 14 of Patent No. 3,045,610.

The empty place spotter 40 signals the unit 38 for the return of a halted branch load truck onto the main conveyor reach 12 when, and only when, a main conveyor trolley 15, which trips the cable pull unit 88 of the empty place spotter, is also unoccupied by a truck tow pin 22. This causes cable 85 to unlatch the back-up rail (not shown) of unit 48, which is then counterweighted upwardly to position to back up the chain dogs. The branch track truck in question is forwarded by the next advancing dog on chain 30.

In the event the signaling main conveyor trolley 15 is occupied by a tow pin, the actuation of the cable pull unit 81 has the effect of disabling the actuation of cable 85. As illustrated in my Patent No. 3,024,741, this is done by affording a lost motion between the cable 85 and the tripped cable pull unit 88, so that the back-up rail remains latched in depressed position.

As advanced by the chain dog, the returned truck passes onto the main conveyor return reach 12, where it is picked up by the signaling trolley 15 and continues along the main conveyor path.

The apparatus is simple, rugged and inexpensive as to its parts. All controls are operated mechanically and under motivation by the trucks alone. The need for accurate synchronization of conveyors is avoided. As indicated, the system is extremely versatile in regard to its possible installations, and standard forms may be employed in numerous different installations, each necessarily more or less custom designed as to the placement of its components.

What I claim as my invention is:

1. A sub-floor signaling device for use in controlling the floor travel of a truck or like mobile unit, comprising a movable actuator positioned beneath a floor in the absence of a mobile unit thereabove and adapted to be elevated above the floor for operation by a passing mobile unit, said actuator having means to operatively connect the same to a control unit to operate the latter to control the travel of said passing unit, a control member mounted beneath said floor and engaged and movably operated by a mobile unit passing above the same, and an operating connection between said control member and actuator to elevate the latter above the floor for operation by said mobile unit, and as thus operated to operate said control unit through said operating connection.

2. A sub-floor signaling device for use in controlling the floor travel of a truck or like mobile unit, comprising a vertically and laterally movable actuator positioned beneath a floor in the absence of a mobile unit thereabove and adapted to be elevated above the floor for operation by a passing mobile unit, said actuator having means to operatively connect the same to a control unit to operate the latter to control the travel of said passing unit, a control member mounted beneath said floor and engaged and movably operated by a mobile unit passing above the same, and an operating connection between said control member and actuator to elevate the latter above the floor only when a mobile unit is in the immediate vicinity thereabove for operation of said mobile unit, said actuator as thus elevated being adapted to be engaged and moved laterally by said mobile unit to operate said control unit through said operating connection.

3. A sub-floor signaling unit to control floor travel of a truck or the like, comprising a movable sub-floor arm disposed beneath a floor to extend across the path of movement of a truck-borne tow pin, a cam movable with said arm, an upright guide, a guide member vertically movable on said guide and engaged by said cam for elevation upon pivoting movement of said arm, an actuator pivoted on said guide member and swingable, as elevated by said guide member, by engagement of a truck carried member therewith, and a member carried by said actuator for operatively connecting the same, upon engagement and swinging of the elevated actuator by said truck carried member, with a further control unit to operate the latter to control the travel of the truck.

4. A sub-floor control and signaling unit comprising a switch unit engageable by and controlling the travel of a floor truck, a vertically pivoted sub-floor arm disposed beneath a floor to extend across the path of movement of a truck-borne tow pin, a cam movable with said arm, an upright guide, a guide member vertically movable on said guide and engaged by said cam for elevation upon pivoting movement of said arm, a comb-type actuator pivoted on said guide member and swingable, as elevated by said guide member, by engagement of a truck carried member therewith, and a member carried by said actuator and operatively connecting the same, upon engagement and swinging of the elevated actuator by said truck carried member, with said switch unit to operate the latter to control the travel of the truck.

5. A signaling system of the type described comprising means providing more than one path to guide mobile units in the travel thereof, said units each having a propelled member guided by said path means, a control unit operable to control the selection of one of said paths for travel by a mobile unit, and a signaling device operatively connected to said control unit to operate the latter, said device including a signaling member mounted for movement into and out of operative position for engagement and operation by a mobile unit, a further movable member mounted for engagement and movement by the propelled member of a mobile unit, and means operatively connecting said further member with said signaling member to move the latter to said operative position upon engagement and operation of said further member by said propelled member.

6. A signaling system of the type described comprising means providing more than one path to guide mobile units in the travel thereof, said units each having a propelled member guided by said path means, a control switch unit operable to control the selection of one of said paths for travel by a mobile unit, and a signaling device including a signaling member mounted for transverse movement relative to at least one of said paths into and out of operative position for engagement and operation by a mobile unit, a further movable member mounted for engagement and movement by the propelled member of a mobile unit, means operatively connecting said further member with said signaling member to move the latter to said operative position upon engagement and operation of said further member by said propelled member, and means operatively connecting said signaling member with said switch unit to operate the latter to control said selection.

7. A signaling system of the type described comprising means providing more than one path to guide mobile units in the travel thereof, said units each having a propelled member guided by said path means, a control unit operable to control the selection of one of said paths for travel by a mobile unit, and a signaling device including a signaling member mounted for transverse rectilinear movement relative to at least one of said paths into and out of operative position for engagement and operation by a mobile unit, a further member pivotally mounted for engagement and movement by the propelled member of a mobile unit, means operatively connecting said further member with said signaling member to move the latter to said operative position upon engagement and operation of said further member by said propelled member, and means operatively connecting said signaling member with said control unit to operate the latter to control said selection.

8. A signaling system of the type described comprising means providing more than one path to guide mobile units in the travel thereof, said units each having a propelled member guided by said path means, a control unit operable to control the selection of one of said paths for travel by a mobile unit, and a signaling device including a signaling member, a further member operable by the propelled member of a mobile unit, means operatively connecting said further member with said signaling member to actuate the latter, and means operatively connecting said signaling member with said control unit to operate the latter to control said selection.

References Cited in the file of this patent

UNITED STATES PATENTS

| | | |
|---|---|---|
| 2,949,862 | Klamp | Aug. 23, 1960 |
| 3,024,741 | Klamp | Mar. 13, 1962 |
| 3,045,610 | Klamp | July 24, 1962 |